(No Model.)

H. McBRIDE.
MICROMETER GAGE.

No. 519,541. Patented May 8, 1894.

Witnesses

Henry McBride,
Inventor

THE NATIONAL LITHOGRAPHING COMPANY,
WASHINGTON, D. C.

UNITED STATES PATENT OFFICE.

HENRY McBRIDE, OF NEW HAVEN, CONNECTICUT, ASSIGNOR TO WILBUR F. DAY AND JOSEPH P. LAVIGNE, OF SAME PLACE.

MICROMETER-GAGE.

SPECIFICATION forming part of Letters Patent No. 519,541, dated May 8, 1894.

Application filed January 7, 1893. Renewed October 27, 1893. Serial No. 489,315. (No model.)

*To all whom it may concern:*

Be it known that I, HENRY MCBRIDE, of New Haven, in the county of New Haven and State of Connecticut, have invented new Improvements in Micrometer-Gages; and I do hereby declare the following, when taken in connection with accompanying drawings and the letters of reference marked thereon, to be a full, clear, and exact description of the same, and which said drawings constitute part of this specification, and represent, in—

Figure 1:
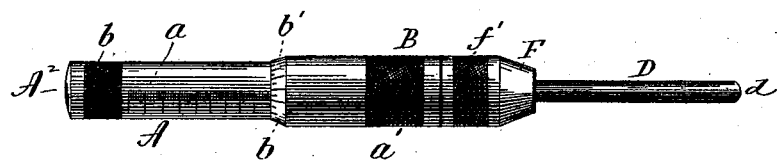
Figure 2:
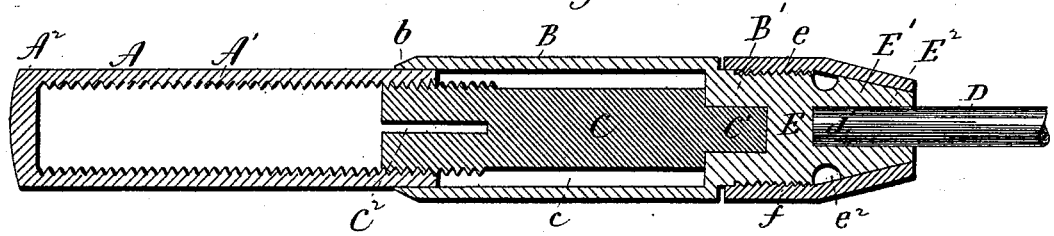
Figure 3:
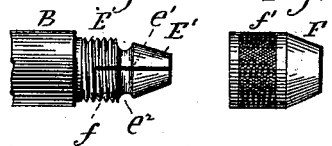
Figure 4:
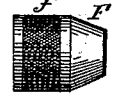
Figure 5:

Figure 1, a view in side elevation of a micrometer gage constructed in accordance with my invention; Fig. 2, a view thereof in central longitudinal section drawn on a larger scale with the outer end of the measuring-piece broken away; Fig. 3, a detached broken view of the outer end of the measuring-sleeve to show the body of the chuck in side elevation; Fig. 4, a detached view in side elevation of the shell of the chuck; Fig. 5, a view in end elevation showing the chuck of the device, and Fig. 6, a view showing several of the interchangeable measuring-pieces employed in connection with the instrument.

My invention relates to an improvement in micrometer gages, the object being to produce a simple, durable, accurate and convenient instrument for inside measurements.

With these ends in view, my invention consists in the combination with a graduated, internally threaded, hollow beam; of a measuring sleeve fitting over the same, a measuring screw connected with the outer end of the said sleeve, and taking into the open end of the beam, a chuck located at the outer end of the sleeve, and a removable measuring-piece inserted into the said chuck in line with the beam, sleeve, and screw.

My invention further consists in certain details of construction and combinations of parts as will be hereinafter described, and pointed out in the claims.

Figure 6:
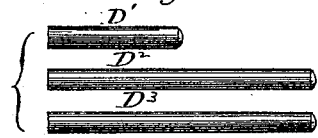

In carrying out my invention, I employ a hollow cylindrical beam A, having an internal screw-thread A', and a rounded outer end A², and provided with longitudinally arranged graduations $a$, and a knurled band $b$, which is located near its outer end, its inner end being open. A measuring-sleeve B fitting over the inner end of the said beam, is constructed with a beveled inner edge $b$, furnished with graduations $b'$, which are used in connection with the graduations $a$, of the beam, the sleeve being also provided with a band $a'$, of knurling to facilitate its rotation while the beam is held in a fixed position by the aid of the knurled band $b$, located at its outer end. A measuring-screw C, connected at its outer end with the outer end of the sleeve B, rotates therewith, its inner end taking into the threads A' on the inside of the beam A. As herein shown, the outer end of the said screw is reduced to form a threaded shank C', which fits into a corresponding opening B', formed for it in the solid outer end of the sleeve. I do not, however, limit myself to any particular way of connecting the sleeve and screw together for rotation, as obviously that result may be effected in other ways. The said sleeve and screw are proportioned so that when connected together, the annular space $c$, between them will be just adapted in size to receive the open inner end of the beam, which as shown in Fig. 2 of the drawings, is represented as being entered into the said space for only a short distance. The inner end of the screw as herein shown, is provided with a longitudinal slot $C^2$, which provides for giving the end of the screw a little spring, whereby the wear between it and the beam is taken up, and the parts more firmly connected together. The said slot $C^2$, also receives a screw-driver, by means of which the screw is fastened to the sleeve. The outer end of the sleeve is provided with a chuck, designed to receive removable rod-like measuring-pieces, of which it is my purpose to use a series, differentiated in length by inches, so that the measuring by inches may be done by interchanging a set of measuring pieces, while measuring fractions of inches will be done by means of the other features of the instrument. Preferably one end of each of the said pieces will be made rounding as shown at $d$, in Fig. 1, and the other end square, as shown at $d'$ in Fig. 2. Fig. 6 shows several of these interchangeable pieces D, D', $D^2$ and $D^3$, of which any convenient number may be used, according to the range of measurements which it is desired that the instrument shall cover.

As herein shown, the body of the chuck referred to, is formed integral with the outer end of the sleeve, and consists of a straight portion E, having external screw-threads $e$, and of a tapered portion E', having longitudinal slots $e'$, a central longitudinal counterbore $E^2$, and an annular recess $e^2$, around its base, to give the jaws formed by slitting it, as described, more flexibility. A shoulder $e^3$ is formed between the straight portion E, of the body of the chuck and the outer end of the sleeve B. The shell F, of the chuck corresponds at its inner end to the diameter of the sleeve B, while its outer end is conical to correspond to the tapering outer-portion E' of the body of the chuck. The said shell has internal screw-threads $f$, to take into the screw-threads $e$, before mentioned, and an exterior knurled band $f'$, which enables it to be gripped by the fingers for being turned. My object in making the outer end of the beam rounding, as at $A^2$, and one end of each of the measuring-pieces, rounding as at $d$, is to adapt the device to measure between curving points, which it could not measure if the said ends were square. But by rounding them as described, that objection is overcome, and in this connection it may be well to say that the highest point of each of the rounded ends is exactly in line with the longitudinal center of the device considered as a whole.

In using my improved device, one of the removable measuring pieces is inserted into it, the said piece being chosen with reference to the character of the work to be done. The device will now represent a certain definite length in inches, and being placed in position, the sleeve is turned upon the beam until the rounded end of the sleeve on one hand, and the end of the measuring-piece on the other hand are just free of the points, the separation of which is being measured. In being used the device may be held by hand, or otherwise supported.

It is apparent that in carrying out my invention, some changes in the construction herein shown and described may be made, I would therefore have it understood that I do not limit myself to the said construction, but hold myself at liberty to make such changes and alterations therein as fairly fall within the spirit and scope of my invention.

Having fully described my invention, what I claim as new, and desire to secure by Letters Patent, is—

1. In a micrometer gage, the combination with a graduated, internally threaded hollow beam, of a measuring sleeve fitting over the same, a measuring-screw connected with the outer end of the said sleeve, and taking into the beam, a chuck located at the outer end of the sleeve, and a removable measuring piece inserted into the said chuck in line with the beam, sleeve and screw, substantially as described.

2. In a micrometer gage, the combination with a graduated, internally threaded hollow beam, of a measuring-sleeve having its inner end open, and adapted to fit over the said beam, a measuring-screw connected with the outer end of the said sleeve, and taking into the beam, a chuck located at the outer end of the said sleeve, having its body formed integral therewith, and comprising an independent shell, and a removable measuring-piece inserted into the said chuck, substantially as described.

In testimony whereof I have signed this specification in the presence of two subscribing witnesses.

HENRY McBRIDE.

Witnesses:
FRED C. EARLE,
LILLIAN D. KELSEY.